(12) United States Patent
Katrak et al.

(10) Patent No.: US 10,511,161 B2
(45) Date of Patent: Dec. 17, 2019

(54) DIAGNOSTIC SYSTEM FOR A DC-DC VOLTAGE CONVERTER

(71) Applicant: LG Chem, Ltd., Seoul (KR)

(72) Inventors: Kerfegar K. Katrak, Fenton, MI (US); Mehdi Rexha, Sterling Heights, MI (US); Kunal Tipnis, Troy, MI (US); Chieh-Kai Chang, Madison Heights, MI (US); Su Hyuk Jang, Troy, MI (US)

(73) Assignee: LG Chem, Ltd., Seoul (KR)

( * ) Notice: Subject to any disclaimer, the term of this patent is extended or adjusted under 35 U.S.C. 154(b) by 393 days.

(21) Appl. No.: 15/646,155

(22) Filed: Jul. 11, 2017

(65) Prior Publication Data
US 2018/0034263 A1 Feb. 1, 2018

Related U.S. Application Data (60) Provisional application No. 62/367,588, filed on Jul. 27, 2016.

(51) Int. Cl.
*H02H 5/04* (2006.01)
*H02M 3/158* (2006.01)
*H02H 1/00* (2006.01)

(52) U.S. Cl.
CPC ............ *H02H 5/04* (2013.01); *H02H 1/0007* (2013.01); *H02M 3/1582* (2013.01)

(58) Field of Classification Search
CPC .... H02M 3/1582; H02M 3/1584; H02H 5/04; H02H 7/1213
See application file for complete search history.

(56) References Cited

U.S. PATENT DOCUMENTS

| | | | | | |
|---|---|---|---|---|---|
| 5,844,399 A | * | 12/1998 | Stuart | ............... | H01M 10/44 323/282 |
| 6,741,436 B2 | * | 5/2004 | Gilbert | ............. | H02M 3/157 361/18 |

(Continued)

FOREIGN PATENT DOCUMENTS

| JP | 2012157091 A | 8/2012 |
|---|---|---|
| KR | 20110134821 A | 12/2011 |
| KR | 20140136021 A | 11/2014 |

OTHER PUBLICATIONS

U.S. Appl. No. 15/246,887, filed Aug. 25, 2016 entitled Diagnostic System for a DC-DC Voltage Converter.

(Continued)

*Primary Examiner* — Thienvu V Tran
*Assistant Examiner* — Christopher J Clark
(74) *Attorney, Agent, or Firm* — Buckert Patent & Trademark Law Firm PC; John F. Buckert (57) ABSTRACT

A diagnostic system for a DC-DC voltage converter is provided. A first temperature sensor generates a first temperature signal associated with a buck mode integrated circuit. A first analog multiplexer outputs the first temperature signal to a first analog-to-digital converter which generates a first temperature value. A second temperature sensor generates a second temperature signal associated with a boost mode integrated circuit. A second analog multiplexer outputs the second temperature signal to a second analog-to-digital converter which generates a second temperature value. A microcontroller generates control signals to command first and second bi-directional switches in the DC-DC voltage converter to each transition to an open operational state if the first temperature value is greater than a first threshold temperature value.

14 Claims, 6 Drawing Sheets

(56) References Cited

U.S. PATENT DOCUMENTS

| | | | | |
|---|---|---|---|---|
| 8,102,162 | B2* | 1/2012 | Moussaoui | H02M 3/1582 323/222 |
| 8,385,030 | B2* | 2/2013 | Maher | H02M 3/1584 323/272 |
| 9,784,771 | B1* | 10/2017 | Katrak | G01R 31/2889 |
| 9,964,599 | B2* | 5/2018 | Katrak | G01R 31/40 |
| 2009/0015199 | A1* | 1/2009 | Kitanaka | H02J 7/0029 320/118 |
| 2011/0080143 | A1* | 4/2011 | Parakulam | H02M 3/1582 320/162 |
| 2011/0305926 | A1* | 12/2011 | Kim | H02J 7/0031 429/7 |
| 2013/0084513 | A1* | 4/2013 | Quan | H02M 3/1582 429/431 |
| 2013/0106195 | A1* | 5/2013 | Kusch | H02J 7/1423 307/82 |
| 2014/0097790 | A1* | 4/2014 | Yeh | H02J 7/0029 320/108 |
| 2015/0054479 | A1* | 2/2015 | Shiwaya | H02M 3/158 323/271 |
| 2015/0102950 | A1* | 4/2015 | Karner | H03M 1/1076 341/120 |
| 2015/0372606 | A1* | 12/2015 | Tamura | H02M 3/33584 363/21.04 |
| 2016/0298589 | A1* | 10/2016 | Setterberg | H02J 7/1446 |

OTHER PUBLICATIONS

U.S. Appl. No. 15/247,087, filed Aug. 25, 2016 entitled Diagnostic System for a DC-DC Voltage Converter.

U.S. Appl. No. 15/249,376, filed Aug. 27, 2016 entitled Diagnostic System for a DC-DC Voltage Converter.

* cited by examiner

DIAGNOSTIC SYSTEM FOR A DC-DC VOLTAGE CONVERTER

CROSS-REFERENCE TO RELATED APPLICATION

This application claims priority to U.S. Provisional Patent Application No. 62/367,588 filed on Jul. 27, 2016, the entire contents of which are hereby incorporated by reference herein.

BACKGROUND

The inventors herein have recognized a need for an improved diagnostic system for a DC-DC voltage converter. The diagnostic system determines if there is an over-temperature condition in the buck mode integrated circuit or an over-temperature condition in a boost mode integrated circuit in the DC-DC voltage converter. And if so, the diagnostic system induces a first bi-directional switch and a second bi-directional switch in the DC-DC voltage converter to each transition to an open operational state.

SUMMARY

A diagnostic system for a DC-DC voltage converter in accordance with an exemplary embodiment is provided. The DC-DC voltage converter has a first bi-directional switch, a second bi-directional switch, and a DC-DC converter control circuit. The DC-DC converter control circuit has a buck mode integrated circuit and a boost mode integrated circuit. The diagnostic system includes a microcontroller generating a first control signal that is received by the DC-DC converter control circuit to command the buck mode integrated circuit to activate, while the boost mode integrated circuit is deactivated. The diagnostic system further includes a first temperature sensor generating a first temperature signal indicative of a temperature level of the buck mode integrated circuit. The diagnostic system further includes a first analog multiplexer having an input port and an output port. The input port of the first analog multiplexer is electrically coupled to the first temperature sensor. The output port of the first analog multiplexer is electrically coupled to a first analog-to-digital converter of the microcontroller. The first analog multiplexer receives the first temperature signal and outputs the first temperature signal to the first analog-to-digital converter. The first analog-to-digital converter generates a first temperature value corresponding to the first temperature signal from the first temperature sensor. The diagnostic system further includes a second temperature sensor generating a second temperature signal indicative of a temperature level of the boost mode integrated circuit. The diagnostic system further includes a second analog multiplexer having an input port and an output port. The input port of the second analog multiplexer is electrically coupled to the second temperature sensor. The output port of the second analog multiplexer is electrically coupled to a second analog-to-digital converter of the microcontroller. The second analog multiplexer receives the second temperature signal and outputs the second temperature signal to the second analog-to-digital converter. The second analog-to-digital converter generates a second temperature value corresponding to the second temperature signal from the second temperature sensor. The microcontroller is operably coupled to the first bi-directional switch and the second bi-directional switch. The microcontroller generates second and third control signals to command the first bi-directional switch and the second bi-directional switch, respectively, to each transition from a closed operational state to an open operational state if the first temperature value is greater than a first threshold temperature value. The microcontroller further generates fourth and fifth control signals to command the first bi-directional switch and the second bi-directional switch, respectively, to each transition from the closed operational state to the open operational state if the second temperature value is greater than a second threshold temperature value.

A diagnostic system for a DC-DC voltage converter in accordance with another exemplary embodiment is provided. The DC-DC voltage converter has a first bi-directional switch, a second bi-directional switch, and a DC-DC converter control circuit. The DC-DC converter control circuit has a buck mode integrated circuit and a boost mode integrated circuit. The diagnostic system includes a microcontroller generating a first control signal that is received by the DC-DC converter control circuit to command the boost mode integrated circuit to activate, while the buck mode integrated circuit is deactivated. The diagnostic system further includes a first temperature sensor generating a first temperature signal indicative of a temperature level of the buck mode integrated circuit. The diagnostic system further includes a first analog multiplexer having an input port and an output port. The input port of the first analog multiplexer is electrically coupled to the first temperature sensor. The output port of the first analog multiplexer is electrically coupled to a first analog-to-digital converter of the microcontroller. The first analog multiplexer receives the first temperature signal and outputs the first temperature signal to the first analog-to-digital converter. The first analog-to-digital converter generates a first temperature value corresponding to the first temperature signal from the first temperature sensor. The diagnostic system further includes a second temperature sensor generating a second temperature signal indicative of a temperature level of the boost mode integrated circuit. The diagnostic system further includes a second analog multiplexer having an input port and an output port. The input port of the second analog multiplexer is electrically coupled to the second temperature sensor. The output port of the second analog multiplexer is electrically coupled to a second analog-to-digital converter of the microcontroller. The second analog multiplexer receives the second temperature signal and outputs the second temperature signal to the second analog-to-digital converter. The second analog-to-digital converter generates a second temperature value corresponding to the second temperature signal from the second temperature sensor. The microcontroller is operably coupled to the first bi-directional switch and the second bi-directional switch. The microcontroller generates second and third control signals to command the first bi-directional switch and the second bi-directional switch, respectively, to each transition from a closed operational state to an open operational state if the first temperature value is greater than a first threshold temperature value. The microcontroller further generates fourth and fifth control signals to command the first bi-directional switch and the second bi-directional switch, respectively, to each transition from the closed operational state to the open operational state if the second temperature value is greater than a second threshold temperature value.

DETAILED DESCRIPTION

Figure 1:
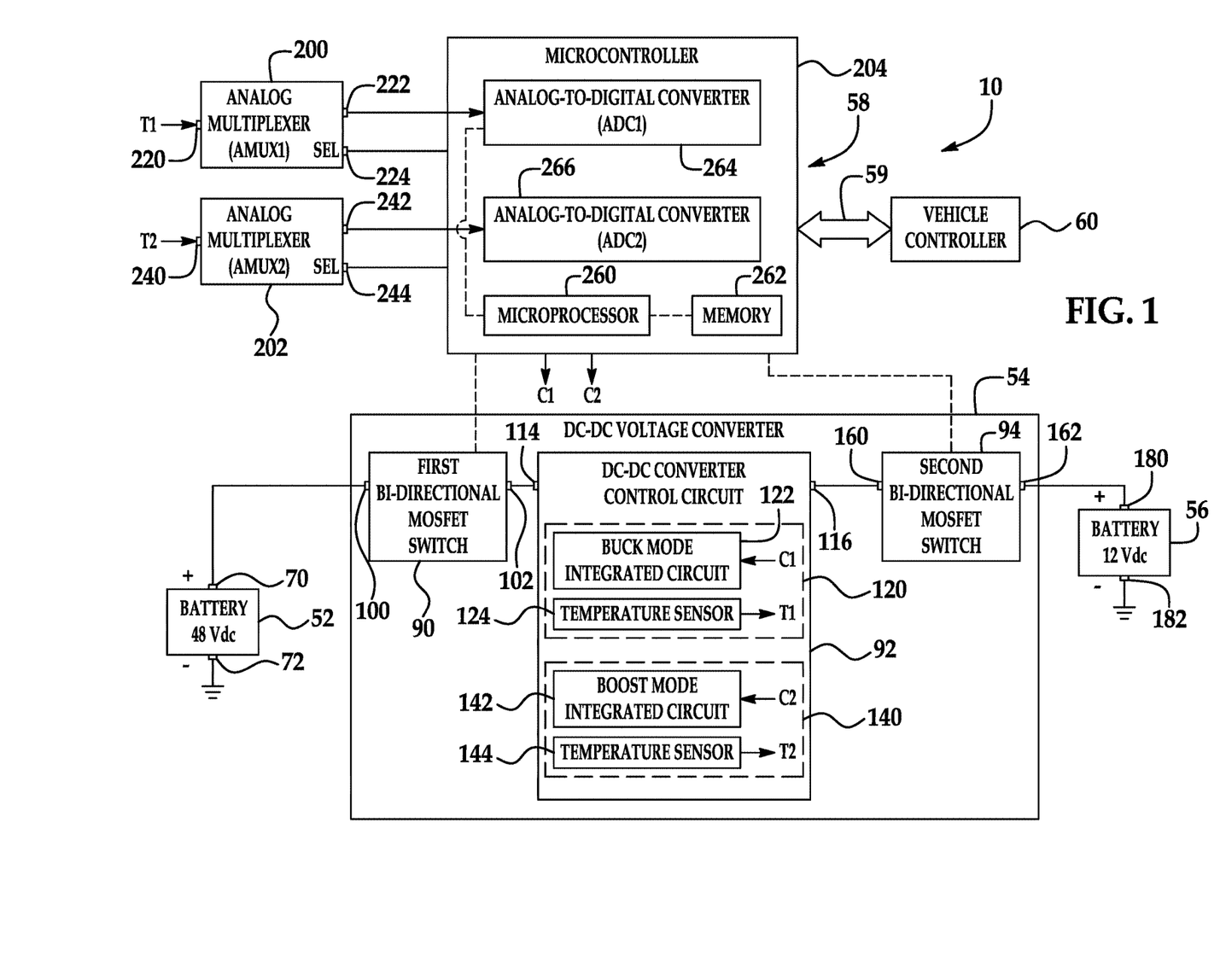
FIG. 1 is a schematic of a vehicle having a diagnostic system for a DC-DC voltage converter in accordance with an exemplary embodiment.

Referring to FIG. 1, a vehicle 10 is provided. The vehicle 10 includes a battery 52, a DC-DC voltage converter 54, a battery 56, a diagnostic system 58 in accordance with an exemplary embodiment, a communication bus 59, and a vehicle controller 60.

An advantage of the diagnostic system 58 is that the system 58 determines if there is an over-temperature condition in the buck mode integrated circuit 122 or an over-temperature condition in a boost mode integrated circuit 142 in the DC-DC voltage converter 54. And if so, the diagnostic system 58 induces a first bi-directional MOSFET switch 90 and a second bi-directional MOSFET switch 94 in the DC-DC voltage converter 54 to each transition to an open operational state such that the DC-DC voltage converter 54 is electrically de-coupled from the batteries 52, 56.

For purposes of understanding, a node is a region or a location in an electrical circuit.

The battery 52 includes a positive terminal 70 and a negative terminal 72. In an exemplary embodiment, the battery 52 generates 48 Vdc between the positive terminal 70 and the negative terminal 72. The positive terminal 70 is electrically coupled to the node 100 of the first bi-directional MOSFET switch 90. The negative terminal 72 is electrically coupled to electrical ground.

The DC-DC voltage converter 54 has a buck operational mode in which the DC-DC voltage converter 54 receives a voltage (e.g., 48 Vdc) from the battery 52 and outputs a DC voltage (e.g., 12 Vdc) to the battery 56. Further, the DC-DC voltage converter 54 has a boost operational mode in which the DC-DC voltage converter 54 receives a voltage (e.g., 12 Vdc) from the battery 56 and outputs a DC voltage (e.g., 48 Vdc) to the battery 52. The DC-DC voltage converter 54 includes the first bi-directional MOSFET switch 90, a DC-DC converter control circuit 92, and a second bi-directional MOSFET switch 94.

Figure 6:
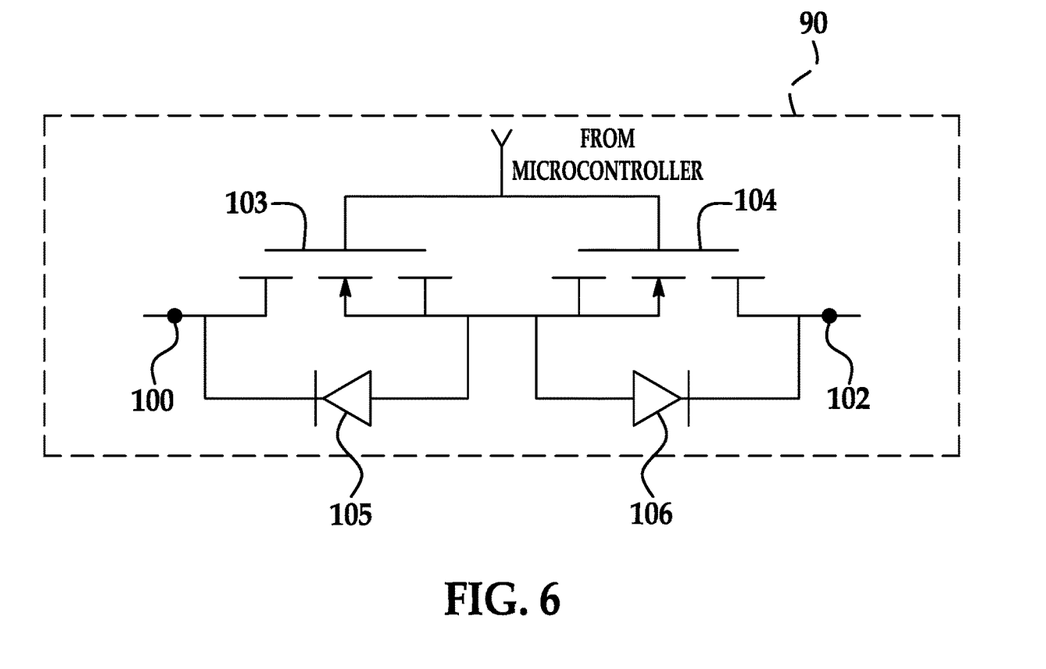
FIG. 6 is a schematic of a bi-directional MOSFET switch utilized in the DC-DC voltage converter of FIG. 1.

Referring to FIGS. 1 and 6, in an exemplary embodiment, the first bi-directional MOSFET switch 90 includes a first node 100, a second node 102, MOSFET switches 103, 104, and diodes 105, 106. Of course, in an alternative embodiment, the first bi-directional MOSFET switch 90 could be replaced with another type of bi-directional switch having desired voltage and current capabilities. The first node 100 is electrically coupled to the positive terminal 70 of the battery 52. The second node 102 is electrically coupled to a first node 114 of the DC-DC converter control circuit 92. When the microcontroller 204 generates a first control signal that is received by the first bi-directional MOSFET switch 90 (or that is received by a controller or a microprocessor within the DC-DC voltage converter 54 that is operably coupled to the switch 90), the switch 90 transitions to a closed operational state. When the microcontroller 204 generates a second control signal, the switch 90 transitions to an open operational state. In an exemplary embodiment, the second control signal is a ground level control signal.

The DC-DC converter control circuit 92 has a first node 114, a second node 116, a circuit board 120, a buck mode integrated circuit 122, a temperature sensor 124, a circuit board 140, a boost mode integrated circuit 142, and a temperature sensor 144.

The circuit board 120 is provided to hold the buck mode integrated circuit 122 and the temperature sensor 124 thereon. When the buck mode integrated circuit 122 is activated by a control signal from the microcontroller 204 such that the DC-DC voltage converter 54 has a buck operational mode, the buck mode integrated circuit 122 induces the DC-DC converter control circuit 92 to output an operational voltage (e.g., 12 Vdc) at the second node 116 to charge the battery 56. The temperature sensor 124 is disposed on the circuit board 120 proximate to and external of the buck mode integrated circuit 122. The temperature sensor 124 generates a temperature signal indicative of a temperature level of the buck mode integrated circuit 122.

The circuit board 140 is provided to hold the boost mode integrated circuit 142 and the temperature sensor 144 thereon. When the boost mode integrated circuit 142 is activated by a control signal from the microcontroller 204 such that the DC-DC voltage converter 54 has a boost operational mode, the boost mode integrated circuit 142 induces the DC-DC converter control circuit 92 to output an operational voltage (e.g., 48 Vdc) at the first node 114 to charge the battery 52. The temperature sensor 144 is disposed on the circuit board 140 proximate to and external of the boost mode integrated circuit 142. The temperature sensor 144 generates a temperature signal indicative of a temperature level of the boost mode integrated circuit 142.

The second bi-directional MOSFET switch 94 includes a first node 160 and a second node 162. The first node 160 is electrically coupled to the second node 116 of the DC-DC converter control circuit 92. The second node 162 is electrically coupled to the battery 56. In an exemplary embodiment, the second bi-directional MOSFET switch 94 has an identical structure as the first bi-directional MOSFET switch 90. Of course, in an alternative embodiment, the second bi-directional MOSFET switch 94 could be replaced with another type of bi-directional switch having desired voltage and current capabilities. When the microcontroller 204 generates a first control signal that is received by the second bi-directional MOSFET switch 94 (or that is received by a controller or a microprocessor within the DC-DC voltage converter 54 that is operably coupled to the switch 94), the switch 94 transitions to a closed operational state. When the microcontroller 204 generates a second control signal, the switch 94 transitions to an open operational state. In an exemplary embodiment, the second control signal is a ground level control signal.

The battery 56 includes a positive terminal 180 and a negative terminal 182. In an exemplary embodiment, the battery 56 generates 12 Vdc between the positive terminal 180 and the negative terminal 182. The positive terminal 180 is electrically coupled to the node 162 of the second bi-directional MOSFET switch 94. The negative terminal 182 is electrically coupled to an electrical ground, which may be electrically isolated from the electrical ground associated with the battery 52.

Referring to FIG. 1, the diagnostic system 58 is provided to perform diagnostic tests on the DC-DC voltage converter 54, which will be described in greater detail below. The diagnostic system 58 includes the temperature sensors 124, 144, analog multiplexers 200, 202, and the microcontroller 204.

The temperature sensor 124 generates a temperature signal indicative of a temperature level of the buck mode integrated circuit 122 which is received by the analog multiplexer 200.

The temperature sensor 144 generates a temperature signal indicative of a temperature level of the boost mode integrated circuit 142 which is received by the analog multiplexer 202.

The analog multiplexer 200 is provided to selectively route the temperature signal from the temperature sensor 124 to the analog-to-digital converter 264 (ADC1). The analog multiplexer 200 includes an input terminal 220, an output terminal 222, and a select terminal 224. The input terminal 220 is electrically coupled to the temperature sensor 124. The output terminal 222 is electrically coupled to the analog-to-digital converter 264 (ADC1). The select terminal 224 is electrically coupled to the microcontroller 204. When the microcontroller 204 generates a select signal that is received by the select terminal 224, the analog multiplexer 200 routes the temperature signal of the temperature sensor 124 from the input terminal 220 to the output terminal 222. The temperature signal is further routed from the output terminal 222 to the analog-to-digital converter 264 (ADC1).

The analog multiplexer 202 is provided to selectively route the temperature signal from the temperature sensor 144 to the analog-to-digital converter 266 (ADC2). The analog multiplexer 202 includes an input terminal 240, an output terminal 242, and a select terminal 244. The input terminal 240 is electrically coupled to the temperature sensor 144. The output terminal 242 is electrically coupled to the analog-to-digital converter 266 (ADC2). The select terminal 244 is electrically coupled to the microcontroller 204. When the microcontroller 204 generates a select signal that is received by the select terminal 244, the analog multiplexer 202 routes the temperature signal of the temperature sensor 144 from the input terminal 240 to the output terminal 242. The temperature signal is further routed from the output terminal 242 to the analog-to-digital converter 266 (ADC2).

The microcontroller 204 includes a microprocessor 260, a memory 262, and the analog-to-digital converters 264, 266. The microcontroller 204 is programmed to perform diagnostic tests (described in flowcharts herein) utilizing the microprocessor 260 which executes software instructions stored in the memory 262. The microprocessor 260 is operably coupled to the analog-to-digital converters 264, 266, the memory 262, the first and second bi-directional MOSFET switches 90, 94, and the DC-DC converter control circuit 92.

The analog-to-digital converter 264 is electrically coupled to the output terminal 222 of the analog multiplexer 200. The analog-to-digital converter 264 samples the temperature signal from the temperature sensor 124 and generates a temperature value corresponding to the sampled temperature signal. In an exemplary embodiment, the temperature signal is a voltage and the temperature value represents a magnitude of the voltage.

The analog-to-digital converter 266 is electrically coupled to the output terminal 242 of the analog multiplexer 202. The analog-to-digital converter 266 samples the temperature signal from the temperature sensor 144 and generates a temperature value corresponding to the sampled temperature signal. In an exemplary embodiment, the temperature signal is a voltage and the temperature value represents a magnitude of the voltage.

Figure 2:
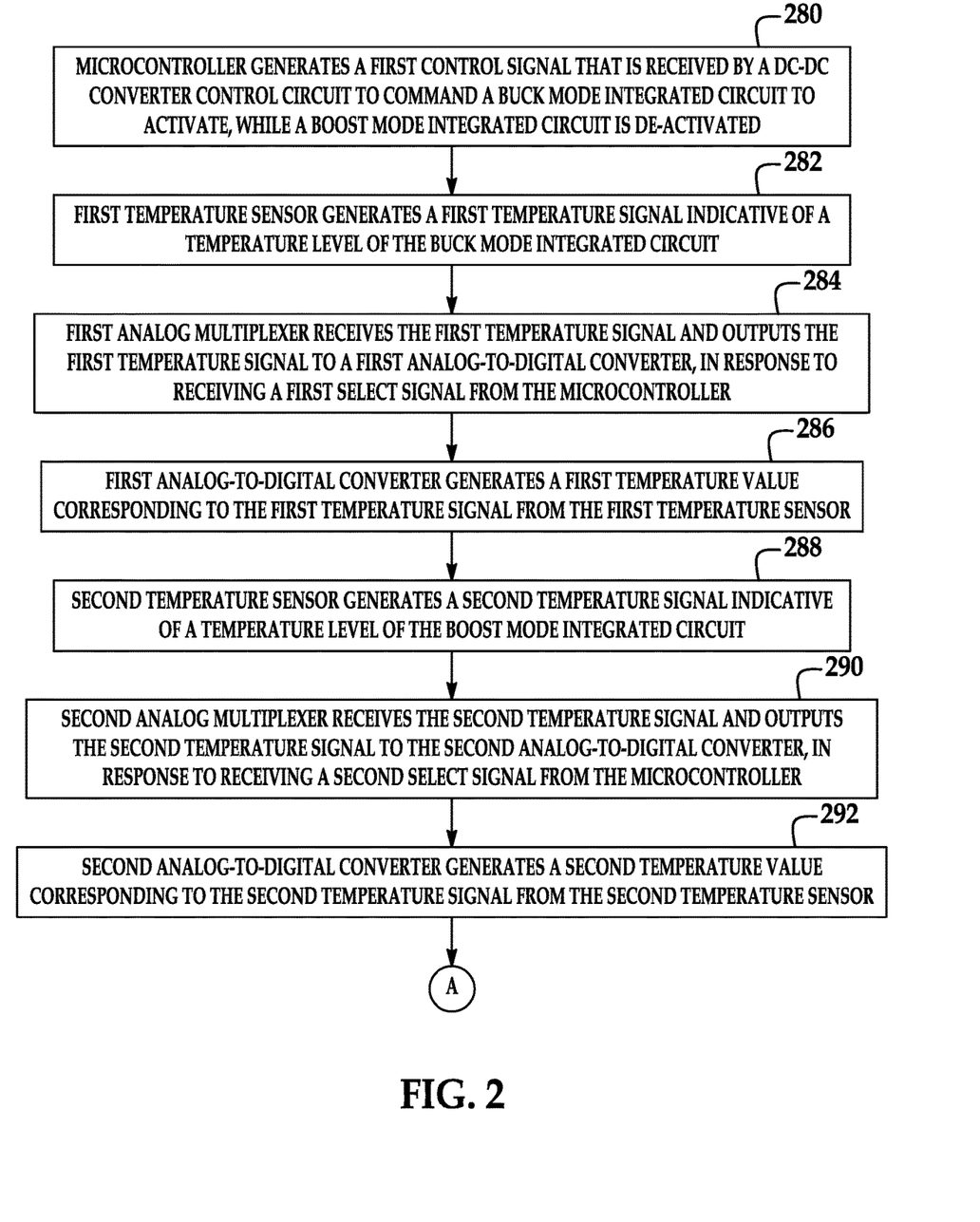
FIGS. 2-3 is a flowchart of a method for performing a first diagnostic test of the DC-DC voltage converter of FIG. 1 in accordance with another exemplary embodiment.
Figure 3:
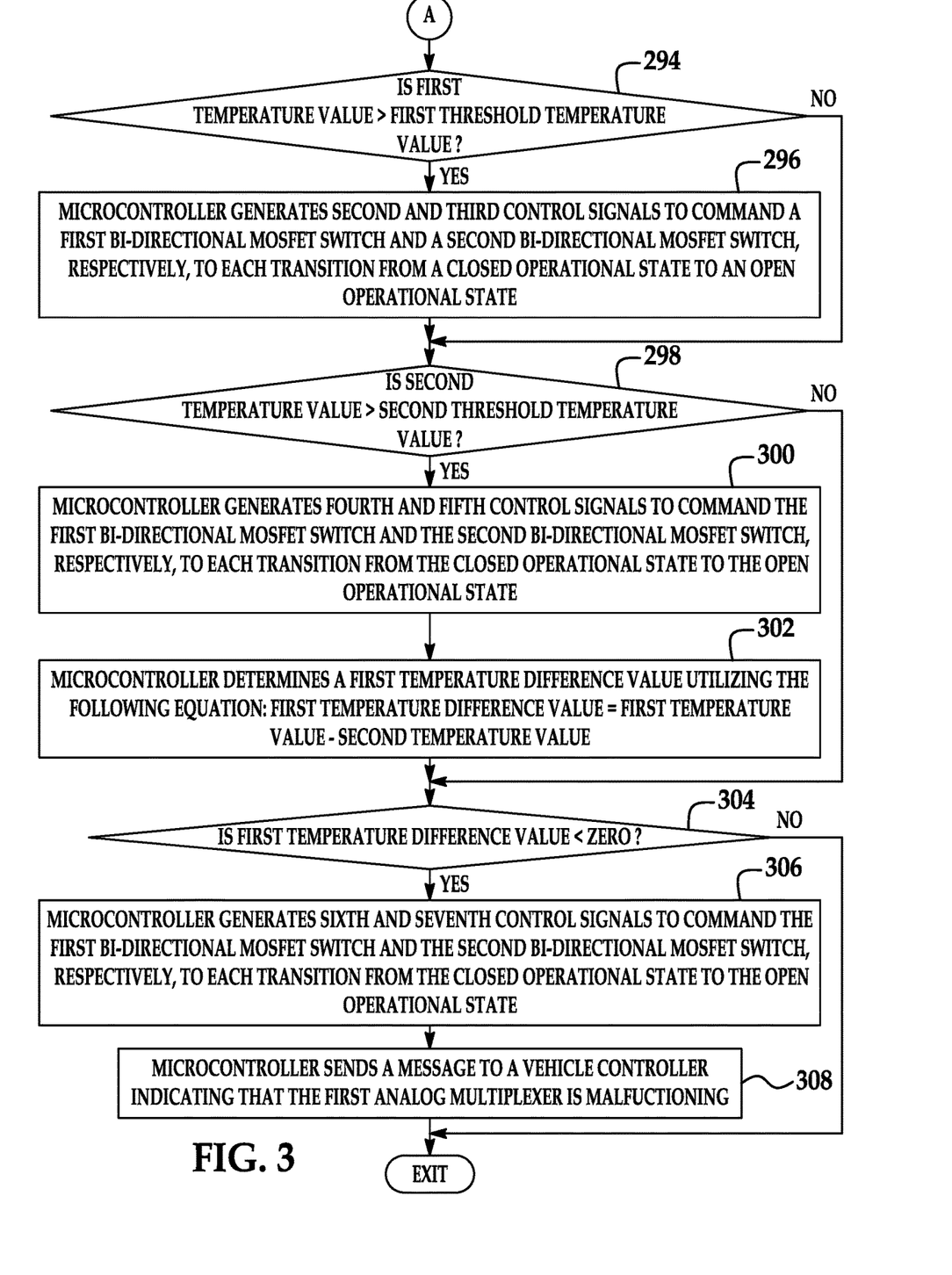

Referring to FIGS. 1-3, a flowchart of a method for performing a first diagnostic test on the DC-DC voltage converter 54 during a buck operational mode, will now be explained.

At step 280, the microcontroller 204 generates a first control signal that is received by the DC-DC converter control circuit 92 to command the buck mode integrated circuit 122 to activate, while the boost mode integrated circuit 142 is deactivated. After step 280, the method advances the step 282.

At step 282, the temperature sensor 124 generates a first temperature signal indicative of a temperature level of the buck mode integrated circuit 122. After step 282, the method advances to step 284.

At step 284, the analog multiplexer 200 receives the first temperature signal and outputs the first temperature signal to the analog-to-digital converter 264, in response to receiving a first select signal from the microcontroller 204. After step 284, the method advances to step 286.

At step 286, the analog-to-digital converter 264 generates a first temperature value corresponding to the first temperature signal from the temperature sensor 124. After step 286, the method advances the step 288.

At step 288, the temperature sensor 144 generates a second temperature signal indicative of a temperature level of the boost mode integrated circuit 142. After step 288, the method advances to step 290.

At step 290, the analog multiplexer 202 receives the second temperature signal and outputs the second temperature signal to the analog-to-digital converter 266, in response to receiving a second select signal from the microcontroller 204. After step 290, the method advances to step 292.

At step 292, the analog-to-digital converter 266 generates a second temperature value corresponding to the second temperature signal from the temperature sensor 144. After step 292, method advances to step 294.

At step 294, the microcontroller 204 makes a determination as to whether the first temperature value is greater than a first threshold temperature value. If the value of step 294 equals "yes", the method advances the step 296. Otherwise, the method advances the step 298.

At step 296, the microcontroller 204 generates second and third control signals to command the first bi-directional MOSFET switch 90 and the second bi-directional MOSFET switch 94, respectively, to each transition from a closed operational state to an open operational state. In an exemplary embodiment, each of the second and third control signals is a ground voltage. After step 296, the method advances the step 298.

At step 298, the microcontroller 204 makes a determination as to whether the second temperature value is greater than a second threshold temperature value. If the value of step 298 equals "yes", the method advances to step 300. Otherwise, the method advances to step 304.

At step 300, the microcontroller 204 generates fourth and fifth control signals to command the first bi-directional MOSFET switch 90 and the second bi-directional MOSFET switch 94, respectively, to each transition from the closed operational state to the open operational state. In an exemplary embodiment, each of the fourth and fifth control signals is a ground voltage. After step 300, the method advances to step 302.

At step 302, the microcontroller 204 determines a first temperature difference value utilizing the following equation: first temperature difference value=first temperature value−second temperature value. After step 302, the method advances to step 304.

At step 304, the microcontroller 204 makes a determination as to whether the first temperature difference value is less than zero. If the value of step 304 equals "yes", method advances to step 306. Otherwise, the method is exited.

At step 306, the microcontroller 204 generates sixth and seventh control signals to command the first bi-directional MOSFET switch 90 and the second bi-directional MOSFET switch 94, respectively, to each transition from the closed operational state to the open operational state. In an exemplary embodiment, each of the sixth and seventh control signals is a ground voltage. After step 306, the method advances to step 308.

At step 308, the microcontroller 204 sends a message to a vehicle controller 60 indicating that the analog multiplexer 200 is malfunctioning. After step 308, the method is exited.

Figure 4:
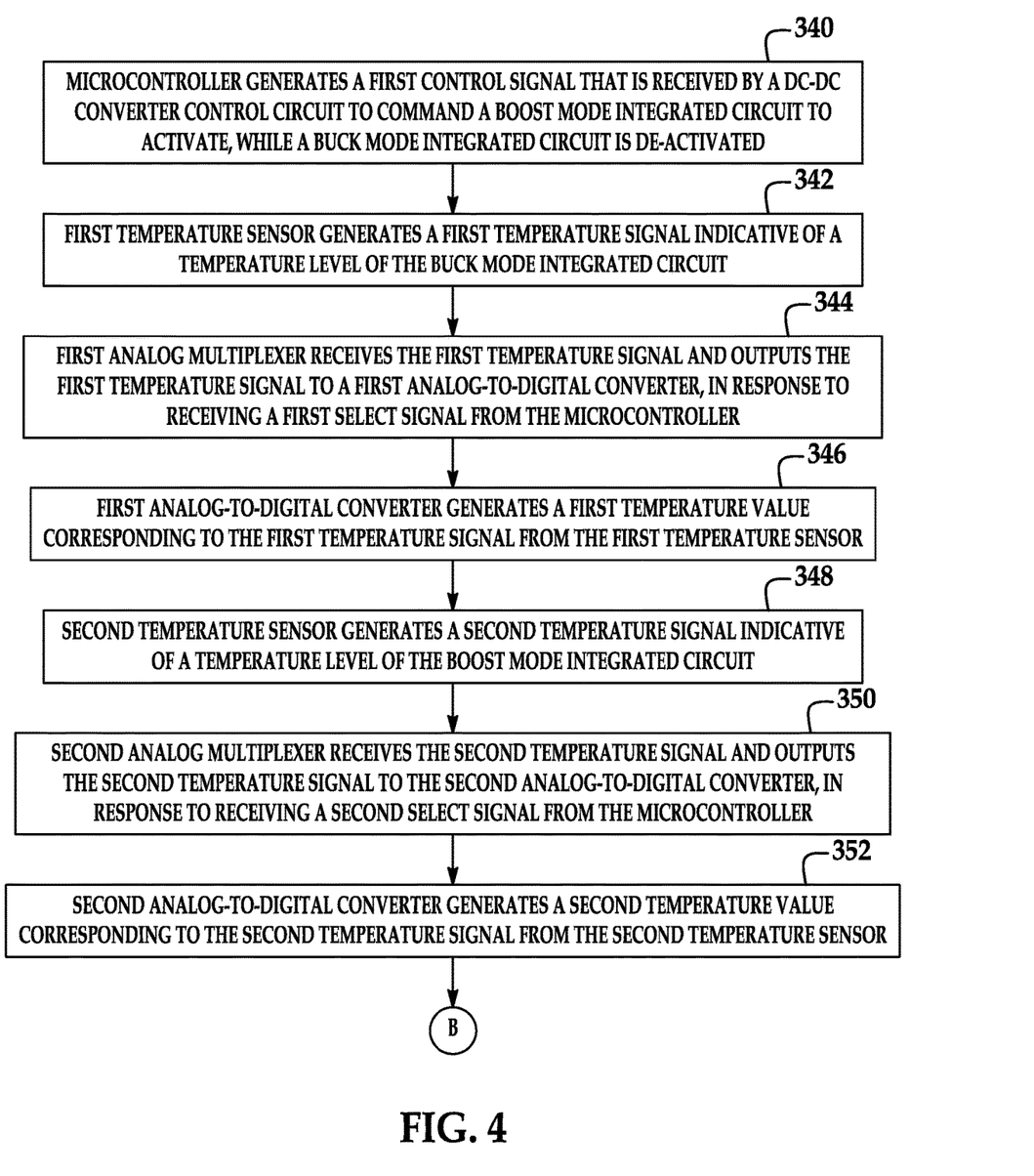
FIGS. 4-5 is a flowchart of a method for performing a second diagnostic test of the DC-DC voltage converter of FIG. 1 in accordance with another exemplary embodiment.
Figure 5:
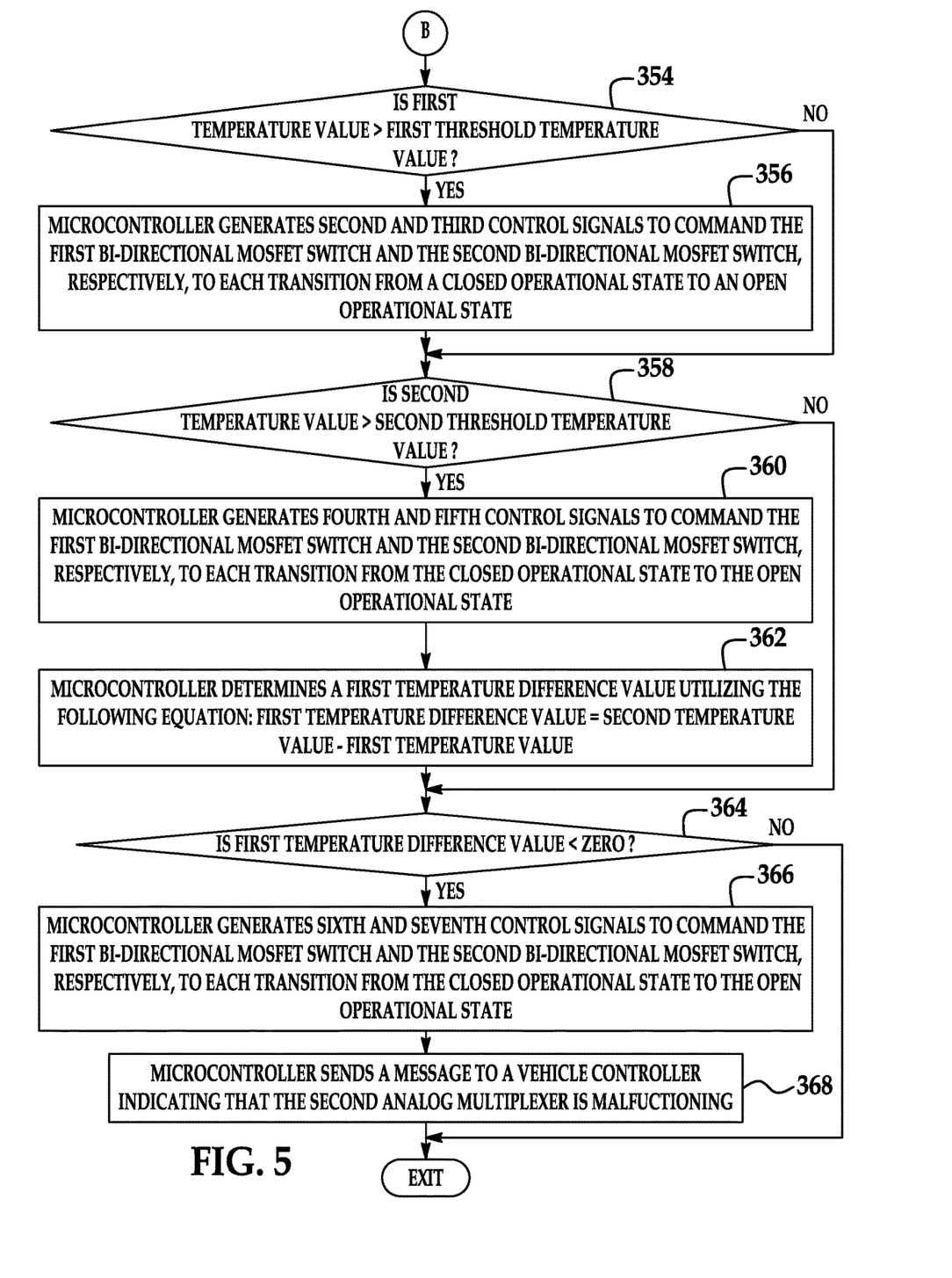

Referring to FIGS. 1, 4 and 5, a flowchart of a method for performing a second diagnostic test on the DC-DC voltage converter 54 during a boost operational mode, will now be explained.

At step 340, the microcontroller 204 generates a first control signal that is received by the DC-DC converter control circuit 92 to command the boost mode integrated circuit 142 to activate, while the buck mode integrated circuit 122 is deactivated. After step 340, the method advances to step 342.

At step 342, the temperature sensor 124 generates a first temperature signal indicative of a temperature level of the buck mode integrated circuit 122. After step 342, the method advances to step 344.

At step 344, the analog multiplexer 200 receives the first temperature signal and outputs the first temperature signal to the analog-to-digital converter 264, in response to receiving a first select signal from the microcontroller 204. After step 344, the method advances to step 346

At step 346, the analog-to-digital converter 264 generates a first temperature value corresponding to the first temperature signal from the temperature sensor 124. After step 346, the method advances to step 348.

At step 348, the temperature sensor 144 generates a second temperature signal indicative of a temperature level of the boost mode integrated circuit 142. After step 348, the method advances to step 350.

At step 350, the analog multiplexer 202 receives the second temperature signal and outputs the second temperature signal to the analog-to-digital converter 266. After step 350, the method advances to step 352.

At step 352, the analog-to-digital converter 266 generates a second temperature value corresponding to the second temperature signal from the temperature sensor 144. After step 352, the method advances to step 354.

At step 354, the microcontroller 204 makes a determination as to whether the first temperature value is greater than a first threshold temperature value. If the value of step 354 equals "yes", the method advances to step 356. Otherwise, the method advances to step 358.

At step 356, the microcontroller 204 generates second and third control signals to command the first bi-directional MOSFET switch 90 and the second bi-directional MOSFET switch 94, respectively, to each transition from a closed operational state to an open operational state. In an exemplary embodiment, each of the second and third control signals is a ground voltage. After step 356, the method advances to step 358.

At step 358, the microcontroller 204 makes a determination as to whether the second temperature value is greater than a second threshold temperature value. If the value of step 358 equals "yes", the method advances to step 360. Otherwise, the method advances to step 364.

At step 360, the microcontroller 204 generates fourth and fifth control signals to command the first bi-directional MOSFET switch 90 and the second bi-directional MOSFET switch 94, respectively, to each transition from the closed operational state to the open operational state. In an exemplary embodiment, each of the fourth and fifth control signals is a ground voltage. After step 360, the method advances to step 362.

At step 362, the microcontroller 204 determines a first temperature difference value utilizing the following equation: first temperature difference value=second temperature value−first temperature value. After step 362, the method advances to step 364.

At step 364, the microcontroller 204 makes a determination as to whether the first temperature difference value is less than zero. If the value of step 364 equals "yes", the method advances to step 366. Otherwise, the method is exited.

At step 366, the microcontroller 204 generates sixth and seventh control signals to command the first bi-directional MOSFET switch 90 and the second bi-directional MOSFET switch 94, respectively, to each transition from the closed operational state to the open operational state. After step 366, the method advances to step 368.

At step 368, the microcontroller 204 sends a message to a vehicle controller 60 indicating that the analog multiplexer 202 is malfunctioning. After step 368, the method is exited.

The diagnostic system for a DC-DC voltage converter 54 described herein provides a substantial advantage over other systems and methods. In particular, the diagnostic system provides a technical effect of determining if there is an over-temperature condition in the buck mode integrated circuit or an over-temperature condition in a boost mode integrated circuit in the DC-DC voltage converter 54. And if so, the diagnostic system induces a first bi-directional MOSFET switch and a second bi-directional MOSFET switch in the DC-DC voltage converter 54 to each transition to an open operational state.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A diagnostic system for a DC-DC voltage converter having first and second switches and a DC-DC converter control circuit comprising:
   a microcontroller generating a first control signal that is received by the DC-DC converter control circuit to command a buck mode integrated circuit therein to activate, while a boost mode integrated circuit therein is de-activated;

a first temperature sensor generating a first temperature signal indicative of a temperature level of the buck mode integrated circuit;

a first analog multiplexer having an input port being electrically coupled to the first temperature sensor, and an output port being electrically coupled to a first analog-to-digital converter of the microcontroller, the first analog multiplexer outputting the first temperature signal to the first analog-to-digital converter;

the first analog-to-digital converter generating a first temperature value corresponding to the first temperature signal;

a second temperature sensor generating a second temperature signal indicative of a temperature level of the boost mode integrated circuit;

a second analog multiplexer having an input port being electrically coupled to the second temperature sensor, and an output port being electrically coupled to a second analog-to-digital converter of the microcontroller, the second analog multiplexer outputting the second temperature signal to the second analog-to-digital converter;

the second analog-to-digital converter generating a second temperature value corresponding to the second temperature signal;

the microcontroller generating second and third control signals to command the first and second switches, respectively, to each transition to an open operational state if the first temperature value is greater than a first threshold temperature value; and the microcontroller generating fourth and fifth control signals to command the first and second switches, respectively, to each transition to the open operational state if the second temperature value is greater than a second threshold temperature value.

2. The diagnostic system of claim 1, wherein:
the microcontroller further determining a first temperature difference value by subtracting the second temperature value from the first temperature value; and
the microcontroller generating sixth and seventh control signals to command the first switch and the second switch, respectively, to each transition to the open operational state if the first temperature difference value is less than zero.

3. The diagnostic system of claim 2, wherein the microcontroller sends a message to a vehicle controller indicating that the first analog multiplexer is malfunctioning if the first temperature difference value is less than zero.

4. The diagnostic system of claim 1, wherein the first temperature sensor is disposed proximate to and external of the buck mode integrated circuit.

5. The diagnostic system of claim 1, wherein the second temperature sensor is disposed proximate to and external of the boost mode integrated circuit.

6. The diagnostic system of claim 1, wherein the first threshold temperature value is greater than the second threshold temperature value.

7. The diagnostic system of claim 1, wherein the first switch is a first bi-directional MOSFET switch, and the second switch is a second bi-directional MOSFET switch.

8. A diagnostic system for a DC-DC voltage converter having first and second switches and a DC-DC converter control circuit comprising:
a microcontroller generating a first control signal that is received by the DC-DC converter control circuit to command a boost mode integrated circuit therein to activate, while a buck mode integrated circuit therein is de-activated;

a first temperature sensor generating a first temperature signal indicative of a temperature level of the buck mode integrated circuit;

a first analog multiplexer having an input port being electrically coupled to the first temperature sensor, and an output port being electrically coupled to a first analog-to-digital converter of the microcontroller, the first analog multiplexer outputting the first temperature signal to the first analog-to-digital converter;

the first analog-to-digital converter generating a first temperature value corresponding to the first temperature signal;

a second temperature sensor generating a second temperature signal indicative of a temperature level of the boost mode integrated circuit;

a second analog multiplexer having an input port being electrically coupled to the second temperature sensor, and an output port being electrically coupled to a second analog-to-digital converter of the microcontroller, the second analog multiplexer outputting the second temperature signal to the second analog-to-digital converter;

the second analog-to-digital converter generating a second temperature value corresponding to the second temperature signal;

the microcontroller generating second and third control signals to command the first and second switches, respectively, to each transition to an open operational state if the first temperature value is greater than a first threshold temperature value; and the microcontroller generating fourth and fifth control signals to command the first and second switches, respectively, to each transition to the open operational state if the second temperature value is greater than a second threshold temperature value.

9. The diagnostic system of claim 8, wherein:
the microcontroller determining a first temperature difference value by subtracting the first temperature value from the second temperature value; and
the microcontroller generating sixth and seventh control signals to command the first switch and the second switch, respectively, to each transition to the open operational state if the first temperature difference value is less than zero.

10. The diagnostic system of claim 9, wherein the microcontroller sends a message to a vehicle controller indicating that the second analog multiplexer is malfunctioning if the first temperature difference value is less than zero.

11. The diagnostic system of claim 8, wherein the first temperature sensor is disposed proximate to and external of the buck mode integrated circuit.

12. The diagnostic system of claim 8, wherein the second temperature sensor is disposed proximate to and external of the boost mode integrated circuit.

13. The diagnostic system of claim 8, wherein the second threshold temperature value is greater than the first threshold temperature value.

14. The diagnostic system of claim 8, wherein the first switch is a first bi-directional MOSFET switch, and the second switch is a second bi-directional MOSFET switch.

* * * * *